US 6,550,237 B1

(12) United States Patent
Adamczyk et al.

(10) Patent No.: US 6,550,237 B1
(45) Date of Patent: Apr. 22, 2003

(54) METHOD AND SYSTEM FOR MONITORING A CATALYTIC CONVERTER

(75) Inventors: Andrew A. Adamczyk, Dearborn, MI (US); Christian Thomas Goralski, Jr., Ypsilanti, MI (US); Eva Thanasiu, Trenton, MI (US)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 10/065,190

(22) Filed: Sep. 25, 2002

(51) Int. Cl.⁷ .................................................. F01N 3/00
(52) U.S. Cl. .............................. 60/277; 60/276; 60/285; 73/118.1
(58) Field of Search .......................... 60/274, 276, 285, 60/277; 73/118.1

(56) References Cited

U.S. PATENT DOCUMENTS

| 5,301,501 A | | 4/1994 | Shimizu et al. ............... 60/274 |
| 5,335,538 A | * | 8/1994 | Blischke et al. ............ 73/118.1 |
| 5,365,216 A | * | 11/1994 | Kotwicki et al. .............. 60/274 |
| 5,832,724 A | | 11/1998 | Watanabe et al. ............. 60/276 |
| 5,839,274 A | * | 11/1998 | Remboski et al. ............. 60/274 |
| 5,899,062 A | | 5/1999 | Jerger et al. .................. 60/274 |
| 6,119,447 A | * | 9/2000 | Eriksson et al. .............. 60/274 |
| 6,192,986 B1 | | 3/2001 | Davey et al. ................. 60/274 |
| 6,216,448 B1 | * | 4/2001 | Schnaibel et al. ............ 60/274 |

* cited by examiner

Primary Examiner—Thomas Denion
Assistant Examiner—Binh Tran
(74) Attorney, Agent, or Firm—John F. Buckert; Allan J. Lippa

(57) ABSTRACT

A method and system are provided for monitoring exhaust gas conversion efficiency of a catalytic converter during operation of an internal combustion engine coupled to the catalytic converter. The system includes an upstream exhaust gas sensor interposed the engine and the catalytic converter for generating a first signal based on the exhaust gas upstream of the converter. A downstream exhaust gas sensor is interposed the catalytic converter and atmosphere for generating a second signal based on the exhaust gas downstream of the converter. A phase shift detector is provided for estimating a phase shift between the first and second signals. A processor is provided for aligning the first and second signals such that the resulting phase shift between the first and second signals is substantially an integer multiple of π radians and for determining conversion efficiency of the catalytic converter based such phase aligned first and second signals. With such method and system, average error of the calculated index ratio using such system and method and the theoretical average error in index ration (IR) is minimized when the phase shift between the upstream and downstream sensor signals is substantially an integer multiple of π radians.

18 Claims, 8 Drawing Sheets

METHOD AND SYSTEM FOR MONITORING A CATALYTIC CONVERTER

BACKGROUND OF INVENTION

1. Technical Field

The present invention relates to a method and system for determining the efficiency of a catalytic converter based on signals generated by pre-and post-catalyst exhaust gas sensors.

2. Background

As is known in the art, increasingly stringent federal regulations limit the permissible levels for emissions. As such, vehicle manufacturers have developed various methods to reduce emissions while improving vehicle performance and fuel economy. To meet these requirements, it is necessary to monitor the performance of the catalyst using an on-board catalyst monitor. These monitors are designed to meet the on-board diagnostics II regulations (OBDII) that state that an automobile manufacturer must be able to determine when the performance of the catalyst has deteriorated to the point that the vehicle is emitting 1.75 times the regulated limit of pollutants. Catalytic converters are often used to reduce emission levels of regulated exhaust gases. The conversion efficiency of a catalytic converter may be monitored using a pre-catalyst oxygen sensor (HEGO sensor) positioned upstream from the catalytic converter and a post-catalyst oxygen sensor (catalyst monitor sensor or CMS) positioned downstream from the catalytic converter.

One method known for indicating conversion efficiency of the catalyst is to calculate a ratio of the accumulated number of CMS transitions or switches to the accumulated number of HEGO transitions or switches. An increasing switch ratio is generally indicative of a degrading catalyst. When the switch ratio exceeds a threshold value, a malfunction indicator light (MIL) is illuminated to alert the vehicle operator.

Another known method for indicating conversion efficiency of the catalyst determines a ratio based on an accumulated per sample change in magnitude of CMS sensor voltage relative to a corresponding change in magnitude of the HEGO sensor voltage.

As is also known in the art, modern gasoline engines are operated by oscillating, the air fuel ratio around the stoichiometric composition for combustion at a fixed frequency. In general, a catalyst that is functioning at high efficiency will significantly damp any oscillations in the amount of oxygen in the exhaust that passes through the catalyst and hence the signal from the rear sensor will be different than the signal from the sensor on a normally functioning catalyst. Numerous mathematical comparisons of the two signals can be made. One particularly useful method is to compare the ratio of the path length of the signal from the rear sensor to that of the front sensor. Such method is described in U.S. Pat. No. 5,899,062 entitled "Catalyst Monitor Using Arc Length of Pre-and Post-Catalyst Sensor Signals" Inventors Robert Joseph Jerger, Christopher Kirk Davey, Michael I. Kluzner and David R. Nader, issued May 4, 1999 assigned to the same assignee as the present invention, the entire subject matter thereof being incorporated herein by reference. As described in such U.S. Patent, and referring to FIGS. 1A–1C, representative voltage signals generated by an upstream 32 (FIG. 1A) and downstream sensor (FIGS. 1B and 1C) are shown. FIG. 1A illustrates an upstream voltage signal from an upstream sensor, here a heated oxygen sensor (HEGO), as a function of time. It is noted that the upstream sensor signal 40 oscillates through a switch point of 0.45 volts between a high voltage and a low voltage in response to the combustion mixture oscillating about the stoichiometric ratio during closed loop control.

FIG. 1B shows a representative downstream voltage signal 42 provided by a downstream sensor as a function of time for a catalyst having relatively high conversion efficiency. Although the frequency of downstream sensor signal is the same as the frequency of upstream sensor signal, the downstream sensor signal has a much different variation in amplitude than upstream sensor signal and is phase shifted due to the propagation delay of exhaust gases passing through the converter and associated exhaust piping. The amplitude variation or excursion of downstream sensor signal (FIG. 1B) is much less than that of upstream sensor signal (FIG. 1A) due to the operation of the catalytic converter in converting the exhaust gases. The arc length method described in the above-referenced U.S. Patent incorporate the time-based or horizontal component of the sensor signal into the catalyst efficiency indicator. FIG. 1C illustrates a representative downstream sensor voltage signal as a function of time. In this case, the amplitude variation of downstream sensor signal is much greater than the variation of downstream sensor signal shown in FIG. 1B. A signal similar to signal to that shown in FIG. 1C results from an aged and deteriorated catalyst having low conversion efficiency. The arc length method recognizes that as the catalyst ages and deteriorates the arc length of the voltage signal provided by downstream sensor generally increases for a given period of time compared with that of an efficient catalyst over the same period of time. The arc length or path distance traversed by the voltage signal may be determined using the line integral of the voltage signal. For example, for a given period of time dL which represents the length of a infinitesimal incremental line segment on the signal, the arc length is preferably determined using any of a number of approximations for the line integral. Since signal information is collected in a discreet fashion over time, the length of the signal can be calculated with a modification of the Pythagorean theorem:

$$\text{signal path length} = \sqrt{\Delta t^2 + A \cdot \Delta V^2}$$

$$\text{Index Ratio} = \frac{\sum \sqrt{\Delta t^2 + A \cdot \Delta V^2}_{\text{downstream sensor}}}{\sum \sqrt{\Delta t^2 + A \cdot \Delta V^2}_{\text{upstream\_sensor}}}$$

Where $\Delta t$ is the time between successive data samples, $\Delta V$ is the change in sensor voltage from one data point to the next and A is a constant used to scale the relative voltage response to the time response. The ratio of the sum of the rear signal to the sum of the front signal over time is then used to calculate an index between 0 and 1 to quantify catalyst performance. A highly efficient catalyst will have an Index Ratio approaching 0 and a catalyst having a relatively low efficiency will have an Index Ratio approaching 1.

While such arc length method provides a performance measure of the catalytic converter, the inventors herein have found a method and system for further improving such arc length technique.

SUMMARY OF INVENTION

In accordance with the present invention, a method and system are provided for monitoring exhaust gas conversion efficiency of a catalytic converter during operation of an internal combustion engine coupled to the catalytic converter. The system includes an upstream exhaust gas sensor interposed the engine and the catalytic converter for generating a first signal based on the exhaust gas upstream of the converter. A downstream exhaust gas sensor is interposed the catalytic converter and atmosphere for generating a second signal based on the exhaust gas downstream of the converter. A phase shift detector is provided for estimating a phase shift between the first and second signals. A processor is provided for aligning the first and second signals such that the resulting phase shift between the first and second signals is substantially an integer multiple of $\pi$ radians and for determining conversion efficiency of the catalytic converter based such phase aligned first and second signals.

With such method and system, the inventors have discovered that the average error of the calculated index ratio using such system and method and the theoretical average error in index ration (IR) is minimized when the phase shift between the upstream and downstream sensor signals is an integer multiple of $\pi$ radians.

In one embodiment, the processor determined arc length of each of the phase aligned first and second signals.

In one embodiment, the processor determines an index ratio from the ratio of one of the determined arc lengths to the other one of the determined arc lengths.

In one embodiment, the processor, processes a portion of samples of the first and second signals, such portion being a function of the determined phase shift to aligning the first and second signals such that the phase shift between the first and second signals is an integer multiple of $\pi$ radians and for determining conversion efficiency of the catalytic converter based such phase aligned first and second signals.

In one embodiment the downstream sensor is a UEGO sensor.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1A:
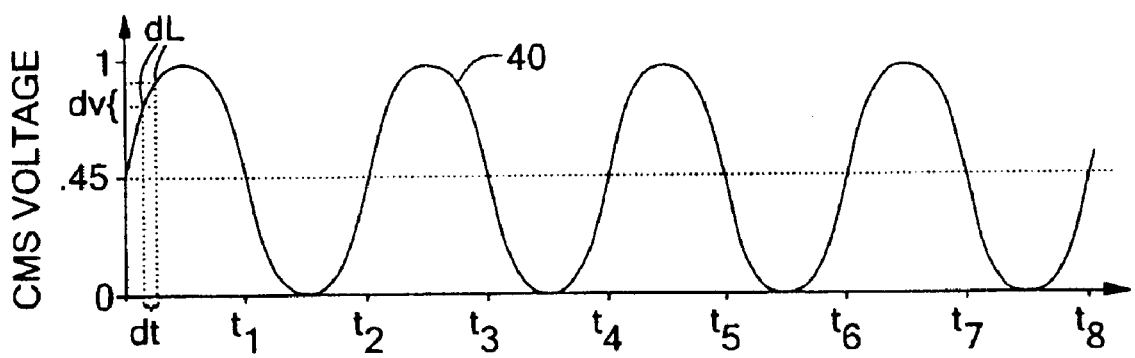
FIG. 1A is a graph of a signal provided by an upstream or front exhaust gas sensor.
Figure 1B:
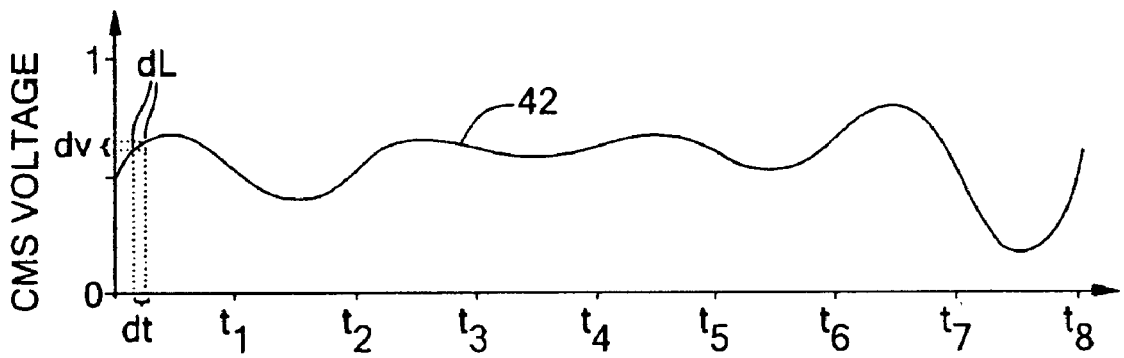
FIG. 1B is a graph of a signal provided by a downstream or rear sensor for a catalytic converter having a high exhaust gas conversion efficiency.
Figure 1C:
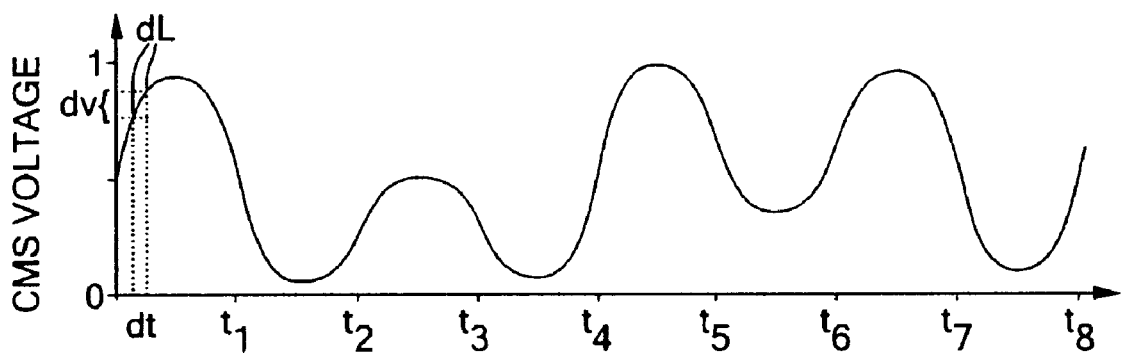
FIG. 1C is a graph of a signal provided by a rear sensor for a catalytic converter having a low efficiency.
Figure 2:
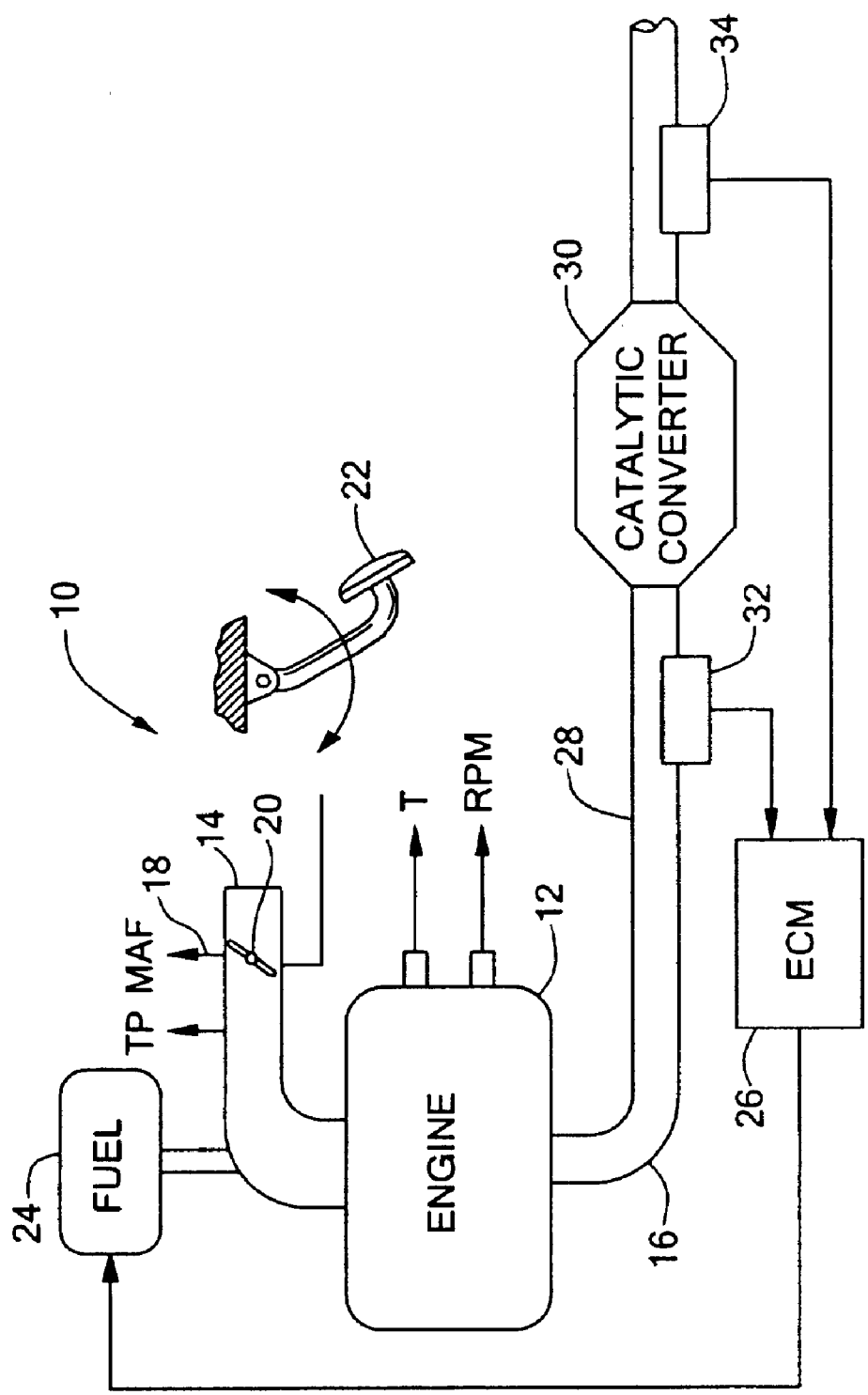
FIG. 2 is a block diagram of an engine system according to the invention.

Referring now to FIG. 2, a block diagram illustrating one embodiment of a system for monitoring performance or conversion efficiency of a catalytic converter is shown. System 10 includes an internal combustion engine 12 having an intake manifold 14 and exhaust manifold 16. Airflow through intake manifold 14 is measured by mass air low (MAF) sensor 18 and regulated by throttle valve 20. A throttle position sensor (TPS) provides a signal indicative of position of throttle valve 20 or an associated accelerator pedal 22. A conventional fuel supply 24 provides fuel which is mixed with the air in intake manifold 14 to provide a combustion mixture which is controlled by an engine controller, such as Engine Control Module (ECM) 26. Of course, ECM 26 may perform control and monitoring functions for various vehicle systems and subsystems in addition to controlling and monitoring engine 12.

An exhaust pipe 28 couples catalytic converter 30, preferably a three-way converter (TWC) to the exhaust stream of engine 12. Catalytic converter 30 is monitored via an upstream exhaust gas sensor 32 and a downstream exhaust gas sensor 34 in communication with the engine controller 26. Upstream sensor 32 is interposed engine 12 and catalytic converter 30 whereas downstream sensor 34 is interposed catalytic converter 30 and atmosphere. Upstream (front) sensor 32 is preferably an exhaust gas oxygen sensor, here either a heated exhaust gas oxygen sensor (HEGO) or a universal exhaust gas oxygen sensor (UEGO) provides an of presence or absence of oxygen in the exhaust stream. Downstream (rear) sensor 34 operates in a similar fashion as upstream sensor 32 but is commonly referred to as a catalyst monitor sensor (CMS), here a UEGO sensor, due to its intended function in the exhaust system. Any of a number of exhaust gas sensors may be utilized including lambda sensors, proportional oxygen sensors, and the like, to determine conversion efficiency of the catalyst according to the present invention.

The ECM 26 includes a microprocessor and various computer readable storage media, which may include but are not limited to a read only memory (ROM), a random access memory (RAM), and a keep-alive memory (KAM). The computer readable storage media may be implemented by any of a number of known volatile and non-volatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 26. Preferably, one or more ROMs within ECM 26 contains control logic implemented by program instructions executed by the microprocessor along with various system parameter values and calibrations.

The ECM 26 receives signals from upstream and downstream exhaust gas sensors 32 and 34, respectively, which reflect current operating conditions of engine 12 and catalyst 30. For example, when at or above operating temperature, sensor 32 provides a continuous signal (preferably a voltage) to ECM 26 based on the oxygen in exhaust pipe 28. The voltage signal is indicative of the excursion from the stoichiometric combustion mixture of the exhaust gases in exhaust manifold 16. The UEGO 34 monitors catalytic converter 30 by detecting the oxygen downstream from converter 30 and provides a voltage signal to ECM 26.

Various other sensors communicate with ECM 26 to facilitate control and monitoring functions. Sensors may include a coolant temperature sensor M, engine speed sensor (RPM), throttle position (TP) sensor, mass airflow (MAF) through the intake manifold of the engine, and the like.

The ECM 26 uses control logic implemented in hardware and/or software to generate various signals to control and monitor operation of engine 12. For example, controller 26 generates an output signal to electronic fuel injectors, represented by fuel supply 24, to control the quantity and timing of fuel delivered to engine 12. ECM 26 is also used to monitor performance of catalytic converter 30 using upstream sensor 32 and downstream UEGO 34. The sensor signals are filtered, periodically sampled, and stored within ECM 26 to monitor performance of catalytic converter 30 as described in detail with reference to FIG. 3.

Figure 3:
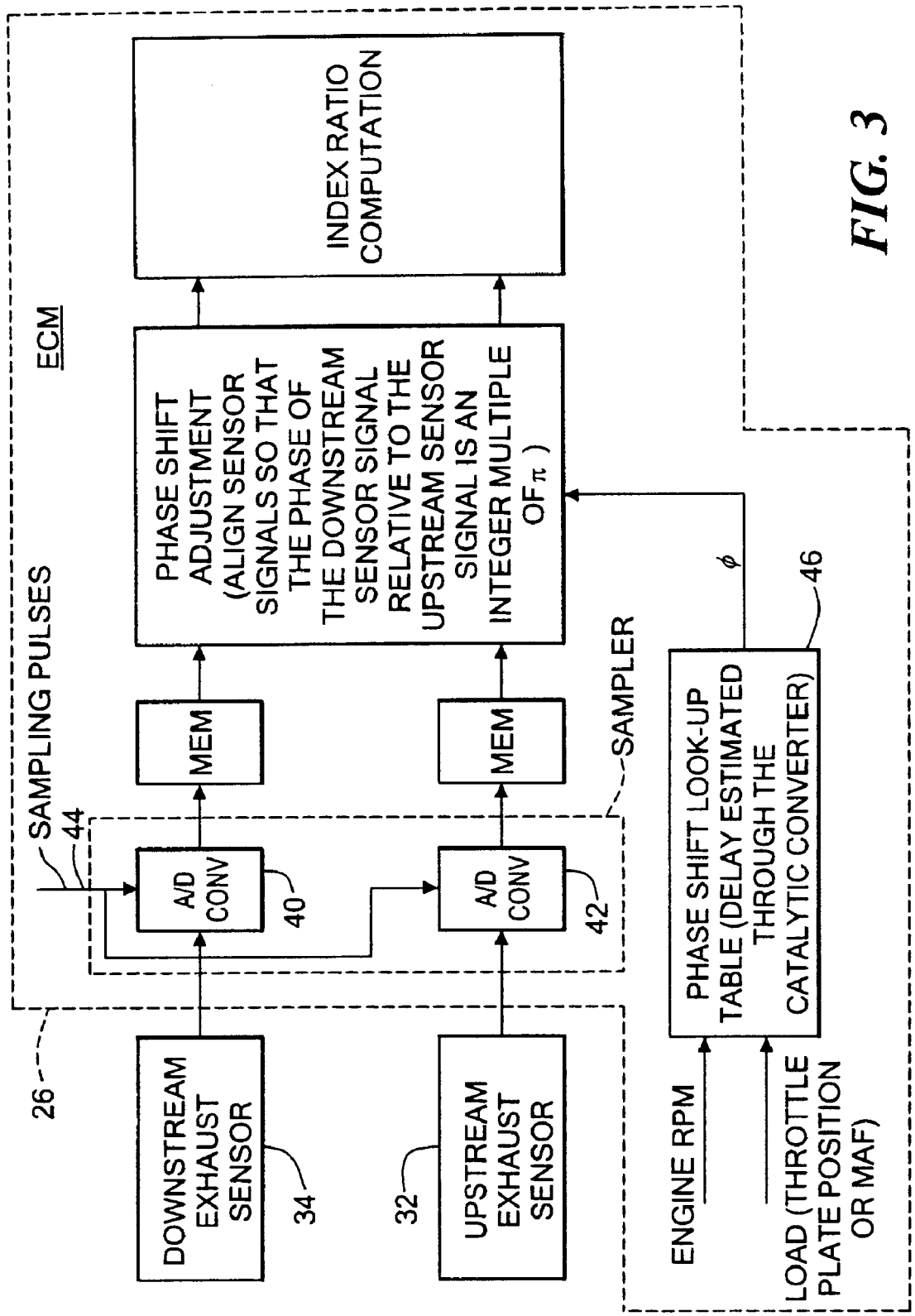
FIG. 3 is a diagram showing a method for determining efficiency of a catalytic converter used in the engine system of FIG. 2 according to the invention.

Thus, referring to FIG. 3, within the ECM 26 is a pair analog to digital (A/D) converters 40, 42 for producing digital samples of the analog signals produced by the downstream and upstream exhaust gas sensors 32, 34, respectively, in response to sampling pulses produced by the EMC on line 44. The samples are stored in memory within the ECM 26. The samples are processed to phase align the signals produced by the upstream and downstream sensors 32, 34 so that they have a relative phase shift between them of $n\pi$, where n is an integer, radians for reasons to be described in more detail below. Suffice it to say here that subsequent to such phase alignment, the index ratio described above is computed. From such computed index ratio the efficiency of the catalytic converter 30 (FIG. 2) is evaluated by the ECM 20. Here, the phase shift $\phi$ is determined from a look-up table 46 stored in the ECM 26. The phase shift $\phi$ is determined as a function of measured engine speed (rpm) and engine load. The engine load is here estimated from detected throttle plate (position (TP) or from the mass airflow through the engine intake manifold (i.e., MAF).

Figure 4:
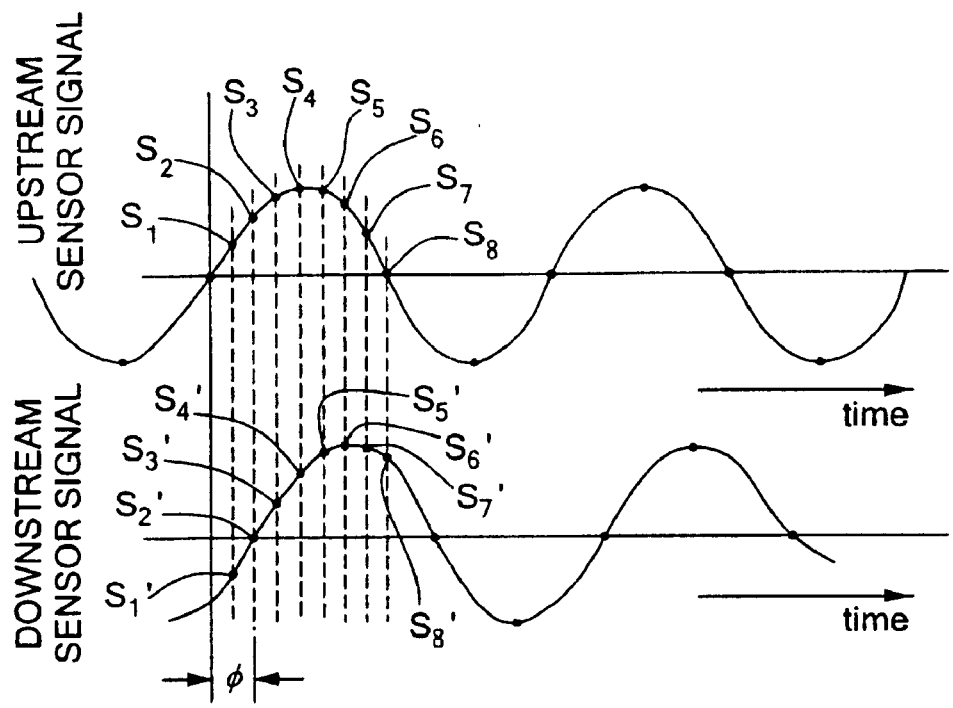
FIG. 4 is curves showing signals produced from exhaust gas sensors disposed upstream and downstream of the catalytic converter used in the engine system of FIG. 1.

Referring to FIG. 4, signals from upstream exhaust gas sensor 32 and downstream exhaust gas sensor 34 are shown along a common time axis. The samples of the upstream sensor 32 taken by A/D converter 42, FIG. 3, are indicated by S1, S2, S3, . . . whereas the samples of the downstream sensor 34 taken by A/D converter 40, FIG. 3, are indicated by S'1, S'2, S'3, . . . . It is noted that the samples with the same numerical notation are taken at the same time. Thus, samples S1 and S'1 are taken at the same time as are samples S8 and S'8, etc. In this example, there is a phase shift, or time delay, between the upstream signal and downstream signals of $\phi$, here in this example corresponding in time to two samples. Thus, the phase shift, $\phi$, between the upstream and downstream gas sensor 32, 34 signals in this example, is 2 $\pi f_m/f_s$ multiplied by the number of samples in the delay, here two samples. Thus, in this example, $\phi=4$ $\pi f_m/f_s$ radians, where $f_s$ is the sampling frequency (in samples per unit time) and $f_m$ is the frequency of the oscillating signal (in cycles per unit time).

To provide the phase alignment, here with n=0, (i.e., the upstream signal is to be in phase with the downstream signal), samples S1–S8 are used to determine the arc length of the upstream signal and samples S'3–S'10 are used to determine the arc length of the downstream signal. It is noted that the same number of samples is used, here 8 samples, in computing both the arc length of the upstream signal and the arc length of the downstream signal. That is, the same sample time duration, T, i.e., the time corresponding to 8 samples, where T equals number of samples divided by the sampling frequency is used in computing the arc length for both the upstream and downstream signals.

Figure 5:
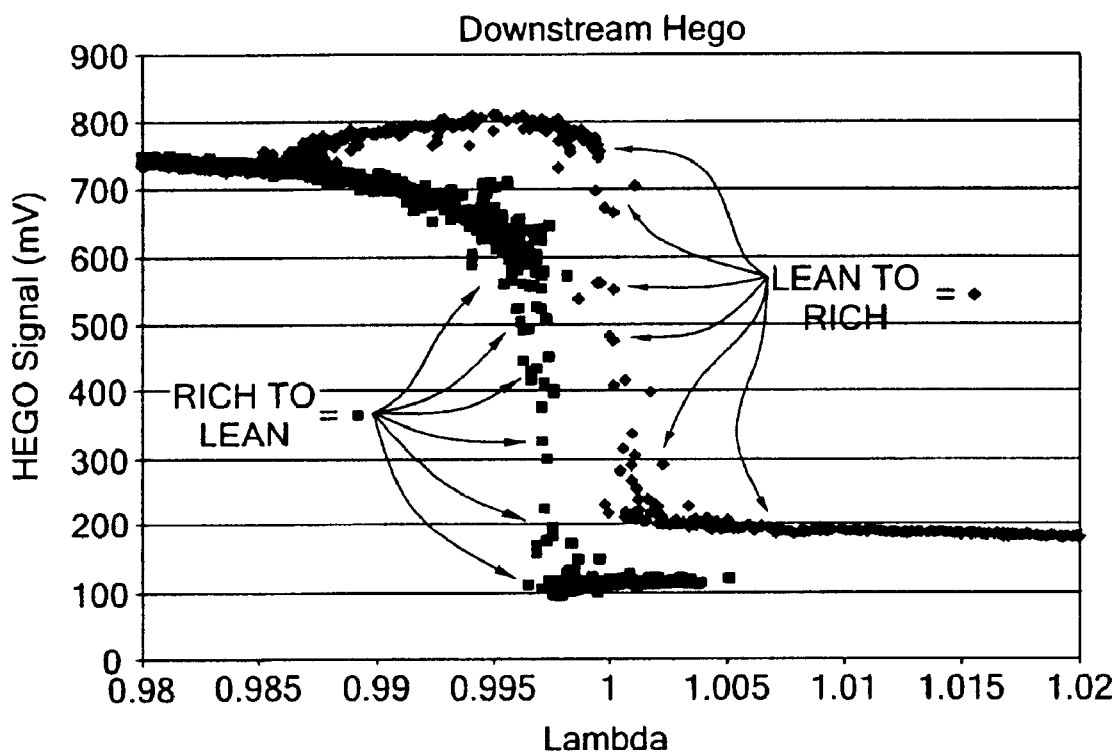
FIG. 5 is a curve showing the output of a HEGO sensor as a function of lambda (air-fuel stoichiometry) as such sensor switches between sensing lean and rich and rich to lean air fuel ratios.

It is noted that heated oxygen sensors (HEGO) are typically used to collect the data to compare catalyst performance, however, due to the transfer function of these sensors, the accuracy of the calculated index ratio changes as a function of time. The transfer function for the HEGO essentially acts as a switch to indicate whether oxygen is present or not, with low voltage indicating oxygen breakthrough and high voltage indicating complete oxygen conversion (no oxygen to the downstream HEGO). In addition, the response has a hysteresis loop (FIG. 5) with different switch points depending on the direction of switch from lean to rich or rich to lean. The result of the transfer function shown below with the hysteresis loop is that small changes in the oxygen concentration will not result in a change in the sensor voltage. The air/fuel ratio of the gases fed to the catalyst varies constantly around the stoichiometric air/fuel ratio, lambda=1.0, due to the control hardware from the engine. These variations in air/fuel ratio are reduced in the catalyst by the oxygen storage material in the catalyst. However, as seen in FIG. 5, certain perturbations are large enough to change the air/fuel ratio after the catalyst and can cause a switch in the rear HEGO sensor. This results in a rear HEGO signal that has different frequency content than the signal from a HEGO placed in front of the catalyst, but will have approximately the same amplitude due to the transfer function of the HEGO. In general, the accuracy of a calculated index ratio will have a sampling time dependence that is a function of the frequency content of the signals. For example, if the front signal has an average frequency content of 1 Hz and the rear sensor has an average frequency of 0.2 Hz, the index ratio calculated at infinite sampling time would be 0.2. However, if one samples for a short period of time, the error at short times would be large since one cycle of the 0.2 Hz signal could only be completely measured in 5 seconds. The theoretical value of the index ratio calculated as a function of time for a 0.2 Hz rear HEGO signal is shown below in FIG. 6. This error is inherent in the way the index ratio is calculated using HEGO sensor signals. The standard deviation in the measured index ratio decreases as a function of time, and, relatively long (10–20 seconds) times are required to achieved standard errors less than 5%. It is desirable to minimize this sampling error because more accurate measurement of the index ratio would yield a more robust monitor.

Figure 6:
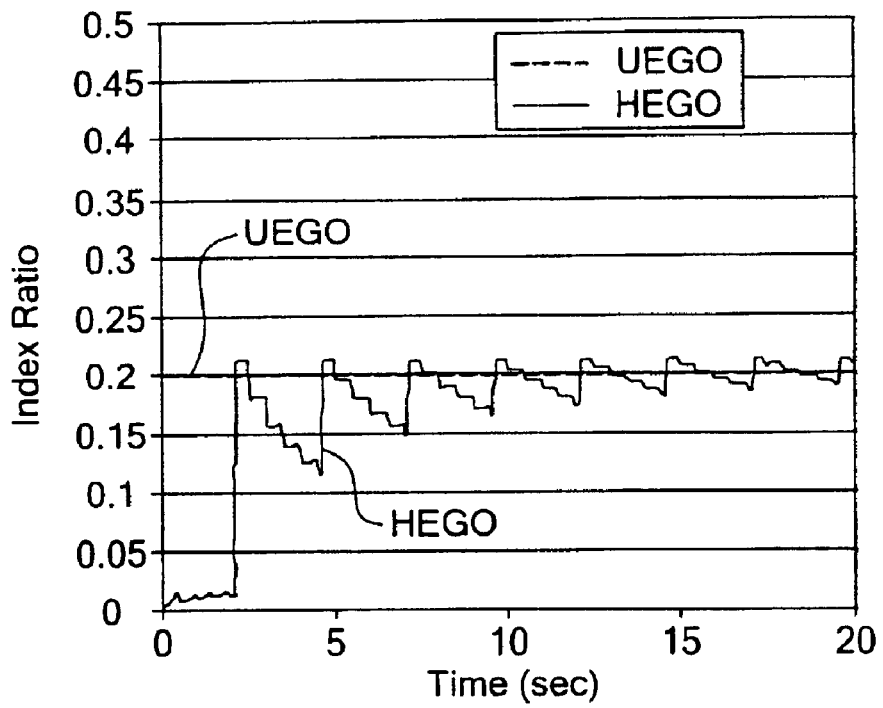
FIG. 6 are curves showing computed index ratio as a function of time from data obtained from a downstream HEGO sensor and a downstream UEGO sensor used in an engine system.

A linearized oxygen sensor (UEGO) placed behind the catalyst can improve the accuracy of the OBDII monitor because this sensor has a near linear response around the stoichiometric air/fuel ratio. This results in a signal that has the same frequency content as the inlet signal but damped amplitude. The theoretical error for a UEGO sensor rear of the catalyst under the same conditions as the HEGO sensor is shown in FIG. 6. The HEGO response for the sensor placed in front of the catalyst must be normalized such that each sensor shows that same range of dynamic response, but this plot shows that the HEGO/UEGO configuration has the ability to have zero theoretical error as a function of time when the inlet and outlet signals are phase aligned.

Figure 7:
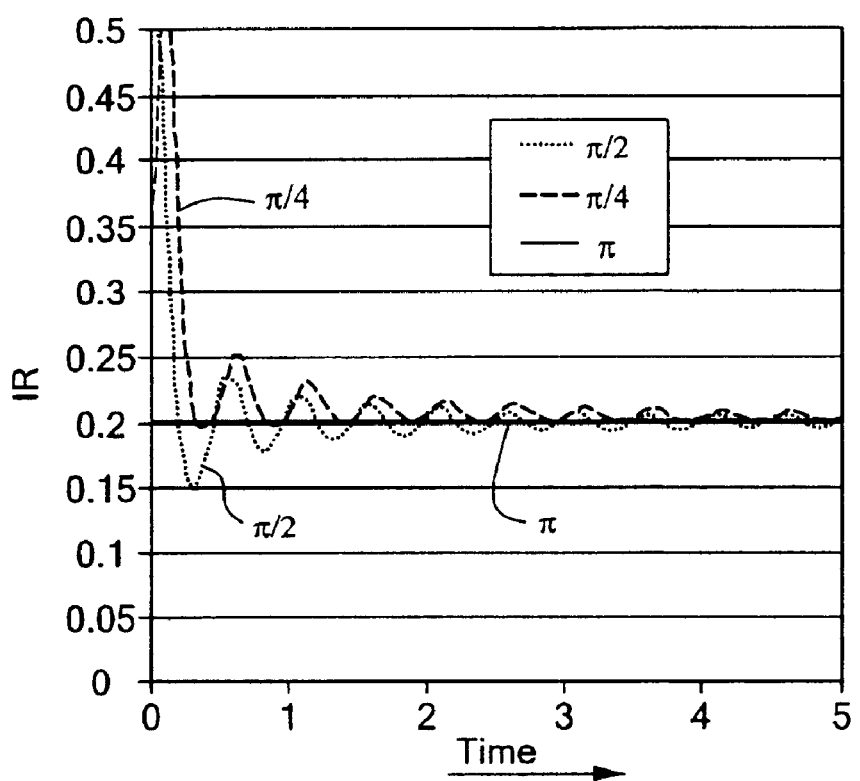
FIG. 7 are curves showing computed index ratio as a function of time where for various phase shifts between signals from linearized signals produced by the upstream and downstream sensors.

FIG. 7 shows a plot of Index Ratio (IR) vs. time for 1 Hz amplitude modulated signals that are π/2, π/4, and π radians out of phase. This plot shows that even the calculated IR from the linearized sensor has theoretical error when the signals are out of phase alignment. Thus, it is necessary to ensure that the phases of the signals are aligned to ensure accuracy of the calculated IR. The phase shift between the signals is related to the gas volume and volumetric flow rate and at short sampling time should be a simple function of flow rate for a fixed geometry system.

Figure 8:
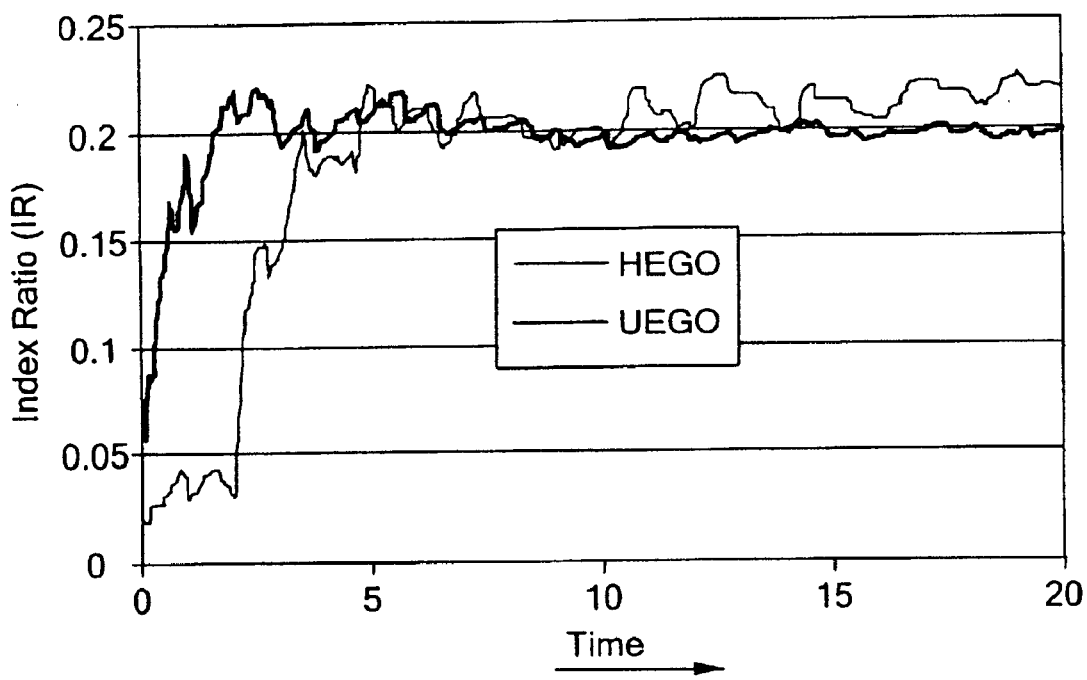
FIG. 8 are curves showing computed index ratio as a function of time measured signals from downstream HEGO and UEGO sensors.

The concepts described here were tested on a pulse flame reactor emulating air/fuel control algorithms used on vehicles. In this experiment, an aged catalyst was placed in the reactor and air/fuel control was maintained with a stoichiometric air/fuel setpoint. HEGO sensors were placed upstream and downstream of the catalyst and the sensor signals were recorded and the index ratio was calculated as a function of sampling time. A plot of the calculated index ratio versus time using downstream HEGO (non-linear) and UEGO (linear) sensors is shown in FIG. 8. This plot clearly demonstrates that the UEGO based index ratio reaches a stabilized result faster than the HEGO based index ratio and would yield more accurate results when the sampling period is short as is the case during vehicle operation.

Figure 9:
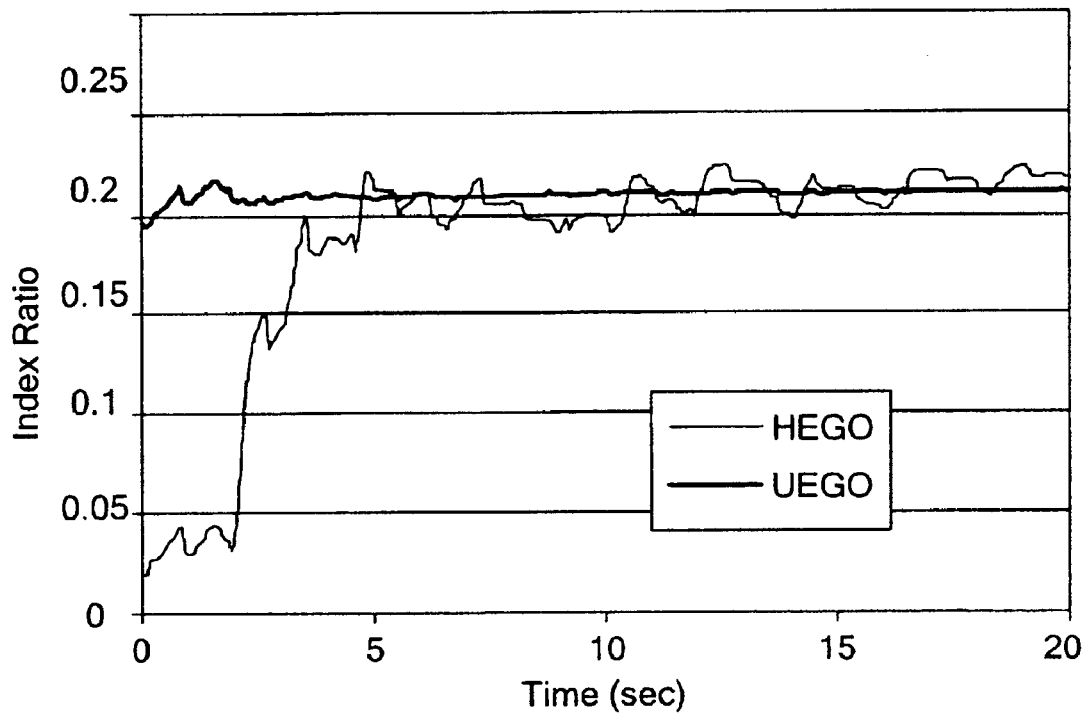
FIG. 9 are curves showing calculated index ratio from downstream HEGO and UEGO sensors with signals from such sensors being phase aligned with signals from an upstream exhaust gas sensor.

The data from FIG. 8 where then phase adjusted in π/20 increments until the most accurate representation of the index ratio with time was found and plotted in FIG. 9. Thus FIG. 9 clearly shows that the temporal accuracy of the index ratio can be greatly improved using a linear sensor and phase aligning the front and rear sensor signals.

Figure 10:
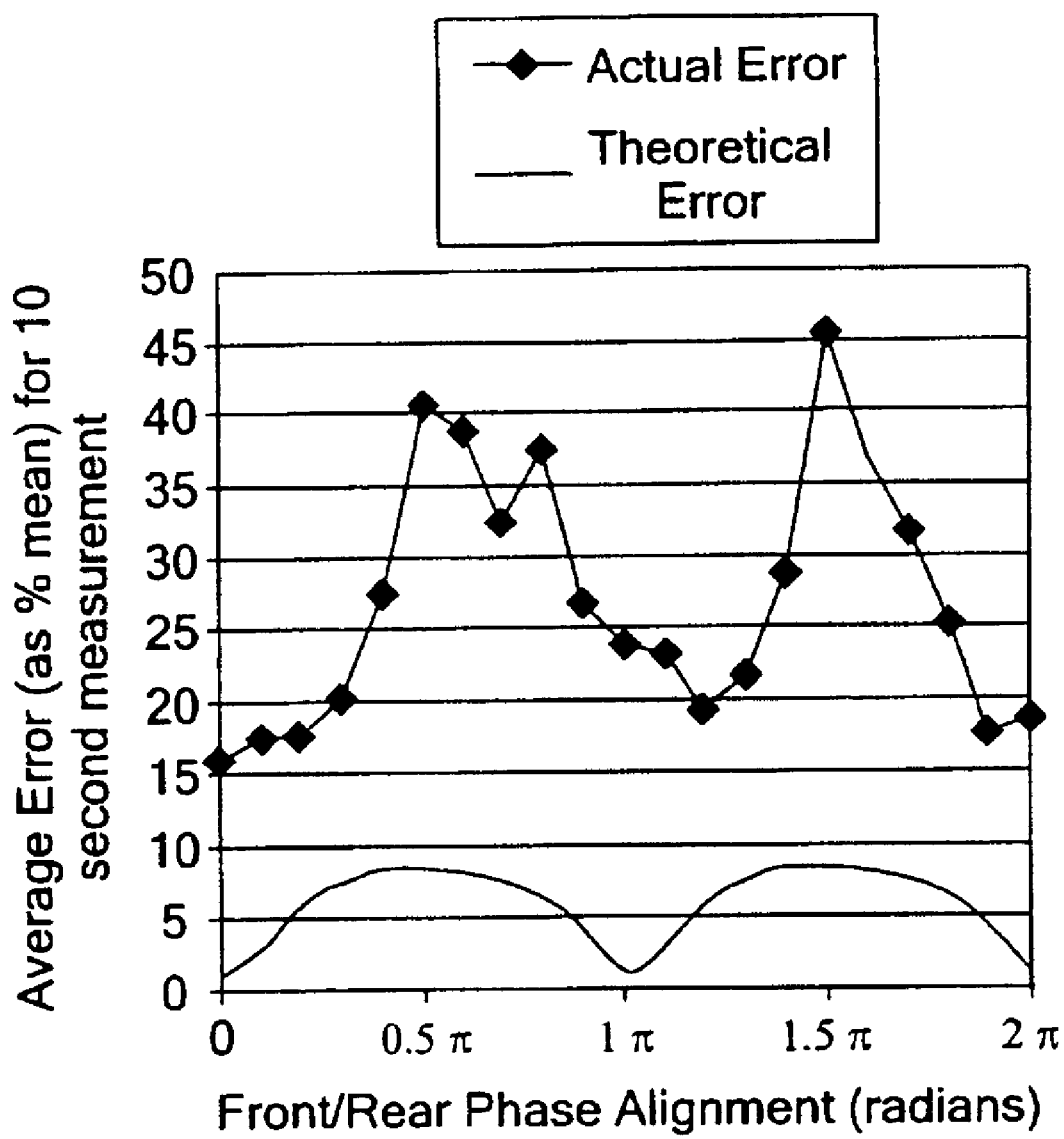
FIG. 10 are curves showing calculated index ratio error as a function of the phase shift between signal from the upstream and downstream exhaust gas sensors.

Referring now to FIG. 10, a plot of the average error of the calculated index ratio and the theoretical average error in index ration (IR) computation during the first 10 seconds of measurement plotted vs. the phase shift between the upstream and downstream sensor signals. This plot shows that the error in IR calculation is minimized at integer multiples of π radians. Note the match is not exact because there are other sources of error in the experiment and the signals do not contain pure 1 Hz frequency content. Thus, the phase shift should be substantially an integer multiple of π radians, for example 20 percent. The example shown here was with 1 signals. The same results could be obtained at other frequencies but the phase shift would be in multiples of pi/frequency radians.

In summary, the steps outlined to monitor the catalyst are shown below:
1. Place HEGO (or UEGO) in front of catalyst and UEGO behind catalyst.
2. Collect signals before and after the catalyst.
3. If using HEGO in front of the catalyst, normalize the response of the HEGO to the same range of UEGO.
4. Phase align the upstream signal with the downstream signal. The initial value of the phase misalignment is taken as 2π divided by the modulus of the transport delay time and signal frequency. That is, the modulus is the remainder, i.e., if the transport delay time is 2.4 seconds and the frequency is 1 Hz, the phase delay is 0.4 seconds (or in the case of 1 Hz frequency, 2*π*0.4 radians)
5. Calculate index ratio of phase aligned UEGO signals.

Figure 11:
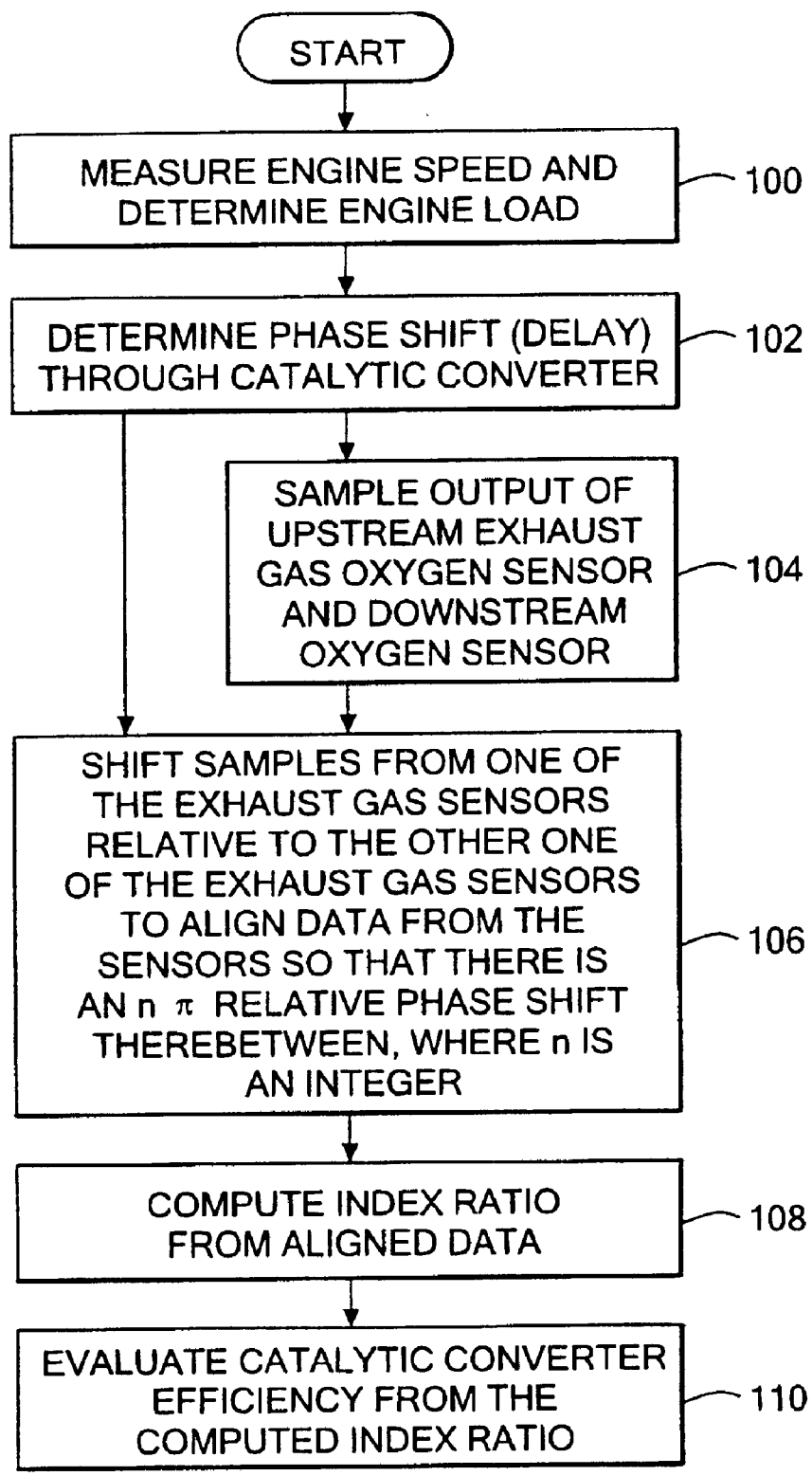
FIG. 11 is a flow diagram of the process used to determine the efficiency if the catalyst in accordance with the invention.

Thus, referring to FIG. 11, a flow diagram generally illustrating operation of a system or method according to the present invention is shown. As will be appreciated by one of ordinary skill in the art, the flow diagram represents control logic which may be implemented in hardware, software, or a combination of hardware and software. Preferably, the control logic is stored in a computer readable medium, such as a PROM, EPROM, EEPROM, or flash memory, and represents program instructions which may be executed by a microprocessor. Of course, other implementations of the control logic using discrete components and/or custom integrated circuits, such as ASICs, are possible without departing from the spirit or scope of the present invention. One of ordinary skill in the art will also recognize that the particular order or sequence illustrated is not necessarily required to achieve the goals and objects of the present invention. Sequential operation of a system or method is shown for ease of illustration and description only. As such, various programming and processing strategies may be used, such as interrupt-driven processing, parallel processing, or the like, depending upon the particular application and implementation.

Thus, in Step 100 engine speed is measured and engine load are determined. From the measured engine sped and calculated engine load, the phase shift φ between the exhaust gas upstream sensor and the downstream sensor is determined, Step 102. The signals from the upstream sensor and the downstream sensor are sampled, Step 104. The samples from the upstream and downstream sensors are processed in accordance with the determined phase shift φ so that the upstream and downstream signals aligned in phase with each other nπ radian, where n is an integer, Step 106. The index ratio is computed from the samples of the phase-aligned signals, Step 108, in accordance with: with a modification of the Pythagorean theorem:

$$\text{signal path length} = \sqrt{\Delta t^2 + A \cdot \Delta V^2}$$

$$\text{Index Ratio} = \frac{\sum \sqrt{\Delta t^2 + A \cdot \Delta V^2}_{downstream\_senosr}}{\sum \sqrt{\Delta t^2 + A \cdot \Delta V^2}_{upstream\ sensor}}$$

Where Δt is the time between successive data samples, ΔV is the change in sensor voltage from one data point to the next and A is a constant used to scale the relative voltage response to the time response. The catalytic converter efficiency is determined from the computed index ratio, Step 110.

A number of embodiments of the invention have been described. Nevertheless, it will be understood that various modifications may be made without departing from the spirit and scope of the invention. Accordingly, other embodiments are within the scope of the following claims.

What is claimed is:

1. A system for monitoring exhaust gas conversion efficiency of a catalytic converter during operation of an internal combustion engine coupled to the catalytic converter, the system comprising:
    an upstream exhaust gas sensor interposed the engine and the catalytic converter for generating a first signal based on the exhaust gas upstream of the converter;
    a downstream exhaust gas sensor interposed the catalytic converter and atmosphere for generating a second signal based on the exhaust gas downstream of the converter;

a phase shift detector for estimating a phase shift between the first and second signals; and a processor, for aligning the first and second signals such that the resulting phase shift between the first and second signals is substantially an integer multiple of $\pi$ radians and for determining conversion efficiency of the catalytic converter based such phase aligned first and second signals.

2. The system of claim 1 wherein the processor determines the arc length of each of the phase aligned first and second signals.

3. The system recited in claim 2 wherein the processor determines an index ratio from the ratio of one of the determined arc lengths to the other one of the determined arc lengths.

4. A system for monitoring exhaust gas conversion efficiency of a catalytic converter during operation of an internal combustion engine coupled to the catalytic converter, the system comprising:

an upstream exhaust gas sensor interposed the engine and the catalytic converter for generating a first signal based on the exhaust gas upstream of the converter;

a downstream exhaust gas sensor interposed the catalytic converter and atmosphere for generating a second signal based on the exhaust gas downstream of the converter; and a phase shift detector for estimating a phase shift between the first and second signals;

a sampler for taking samples of the first and second signals;

a processor, processing a portion of the samples of the first and second signals, such portion being a function of the determined phase shift to aligning the first and second signals such that the resulting phase shift between the first and second signals is substantially an integer multiple of $\pi$ radians and for determining conversion efficiency of the catalytic converter based such phase aligned first and second signals.

5. The system of claim 4 wherein the processor determines an arc length of each of the phase aligned first and second signals.

6. The system recited in claim 5 wherein the processor determines an index ratio from the ratio of one of the determined arc lengths to the other one of the determined arc lengths.

7. A method for monitoring performance of a catalytic converter coupled to an exhaust of an engine using an upstream exhaust gas sensor disposed between the engine and the catalytic converter and a downstream exhaust gas sensor disposed between the catalytic converter and atmosphere, the upstream and downstream exhaust gas sensors generating first and second signals based on the exhaust before and after the catalytic converter; respectively, the method comprising:

estimating a phase shift between the first and second signals;

aligning the first and second signals such that the phase shift between the first and second signals is substantially an integer multiple of $\pi$ radians; and determining conversion efficiency of the catalytic converter based upon such phase aligned first and second signals.

8. The method of claim 7 including determining an arc length of each of the phase aligned first and second signals.

9. The method of claim 8 including determining an index ratio from the ratio of one of the determined arc lengths to the other one of the determined arc lengths.

10. A method for monitoring exhaust gas conversion efficiency of a catalytic converter during operation of an internal combustion engine coupled to the catalytic converter, the system comprising:

generating an upstream exhaust gas sensor signal based on the exhaust gas upstream of the converter from an exhaust gas sensor interposed between the engine and the catalytic converter;

generating a downstream exhaust gas sensor signal based on the exhaust gas downstream of the converter from an exhaust gas sensor interposed the catalytic converter and atmosphere;

estimating a phase shift between the upstream and downstream signals;

sampling the upstream and downstream signals;

processing a portion of the samples of the upstream and downstream signals, such portion being a function of the determined phase shift to align the upstream and downstream signals such that the phase shift between the upstream and downstream signals is substantially an integer multiple of $\pi$ radians; and determining conversion efficiency of the catalytic converter based such phase aligned upstream and downstream signals.

11. The method of claim 10 including determining arc length of each of the phase aligned upstream and downstream signals.

12. The system recited in claim 11 including determining an index ratio from the ratio of one of the determined arc lengths to the other one of the determined arc lengths.

13. A computer readable storage medium for use with an engine controller for monitoring performance of a catalytic converter coupled to an exhaust of an engine using an upstream exhaust gas sensor disposed between the engine and the catalytic converter and a downstream exhaust gas sensor disposed between the catalytic converter and atmosphere, the upstream and downstream exhaust gas sensors generating first and second signals based on the exhaust before and after the catalytic converter, respectively, the computer readable medium comprising:

code estimating a phase shift between the first and second signals;

code for aligning the first and second signals such that the resulting phase shift between the first and second signals is substantially an integer multiple of $\pi$ radians; and code determining conversion efficiency of the catalytic converter based such phase aligned first and second signals.

14. The storage medium of claim 13 wherein such medium includes code for determining an arc length of each of the phase aligned first and second signals.

15. The storage medium of claim 13 wherein such medium includes code determining an index ratio from the ratio of one of the determined arc lengths to the other one of the determined arc lengths.

16. A computer readable storage medium for use with an engine controller for monitoring performance of a catalytic converter coupled to an exhaust of an engine using an upstream exhaust gas sensor disposed between the engine and the catalytic converter and a downstream exhaust gas sensor disposed between the catalytic converter and atmosphere, the upstream and downstream exhaust gas sensors generating first and second signals based on the exhaust before and after the catalytic converter, respectively, the computer readable medium comprising:

code for estimating a phase shift between the first and second signals;

code sampling the first and second signals;

code for processing a portion of the samples of the first and second signals, such portion being a function of the determined phase shift to align the upstream and downstream signals such that the resulting phase shift between the first and second signals is substantially an integer multiple of $\pi$ radians; and code determining conversion efficiency of the catalytic converter based such phase aligned first and second signals.

17. The medium of claim 16 wherein such medium includes code for determining arc length of each of the phase aligned first and second signals.

18. The medium recited in claim 17 wherein such medium includes code for determining an index ratio from the ratio of one of the determined arc lengths to the other one of the determined arc lengths.

* * * * *